Dec. 21, 1937. E. G. CARROLL 2,102,833
BRAKE
Filed May 18, 1932 2 Sheets-Sheet 1

INVENTOR.
EUGENE G. CARROLL
BY Jerome R. Cox
ATTORNEY.

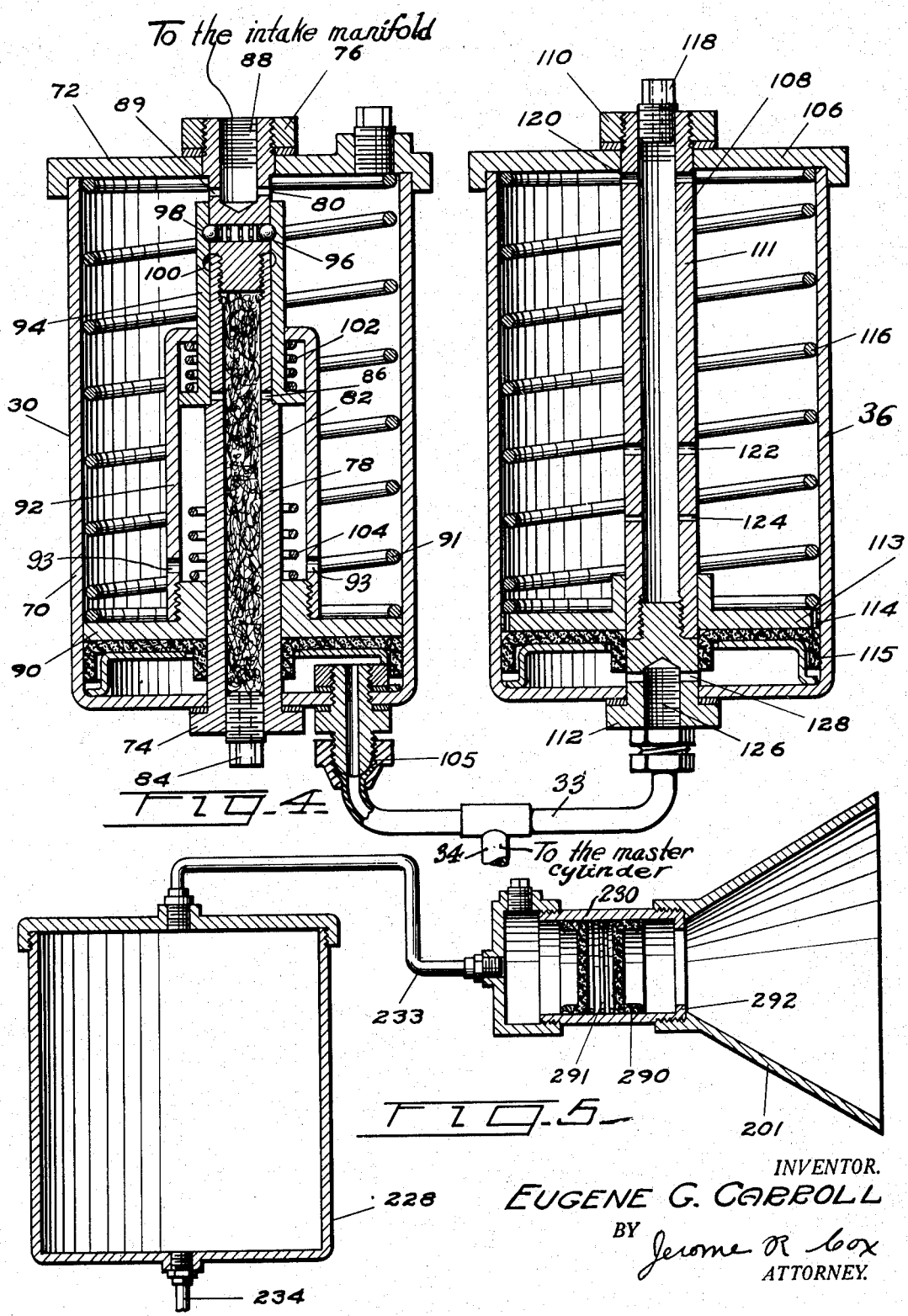

Patented Dec. 21, 1937

2,102,833

UNITED STATES PATENT OFFICE 2,102,833

BRAKE

Eugene G. Carroll, South Bend, Ind., assignor to Bendix Aviation Corporation, South Bend, Ind., a corporation of Delaware Application May 18, 1932, Serial No. 612,139

5 Claims. (Cl. 60—54.6)

This invention relates to braking systems, and is illustrated as applied to a hydraulic braking system.

One of the difficulties sometimes encountered in hydraulic brakes is that of maintaining the fluid connections free of air and other gases. Failure to accomplish this, causes a resilient or springy transmission of energy from the master cylinder to the wheel cylinder. Where the hydraulic braking system is maintained under atmospheric pressure, it is relatively easy for air to be drawn into the system, thus causing bubbles of air to become mixed with the liquid. During the braking operation this air may be compressed thus causing a loss of effectiveness in the operation of the brakes.

One of the objects of this invention is to provide means for automatically maintaining the liquid in a hydraulic braking system under a predetermined superatmospheric pressure.

A further object of the invention is to provide means operated by the engine for developing such pressure.

A further object of the invention is to provide means responsive to speed of travel of the vehicle for developing such pressures.

One of the features of the invention is the construction of my efficient vacuum operated pump for building up pressures.

A further feature of the invention is my wind pressure pump operative for building up pressures on the liquid in the hydraulic braking system.

Additional objects and features of the invention will be apparent after a reading of the subjoined specification and claims and after a consideration of the accompanying drawings in which:

Figure 4 is an enlarged view in vertical section of the vacuum operated pump and of the fluid reservoir shown in Figure 1; and Figure 5 is a view in vertical section of a modified system for maintaining the liquid under superatmospheric pressure.

Figure 1:
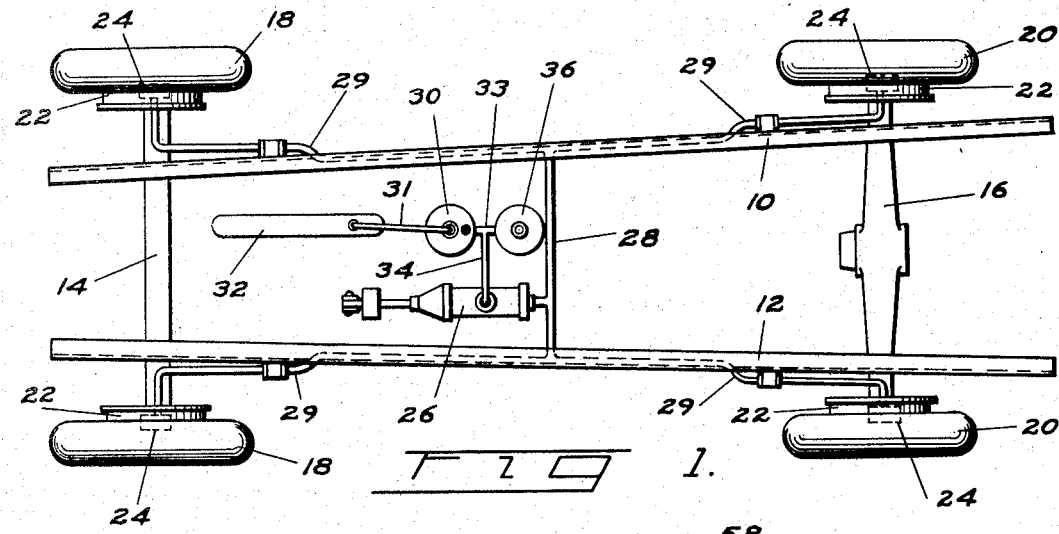
Figure 1 is a plan view of a chassis of an automobile equipped with a hydraulic braking system constructed according to my invention.
Figure 2:
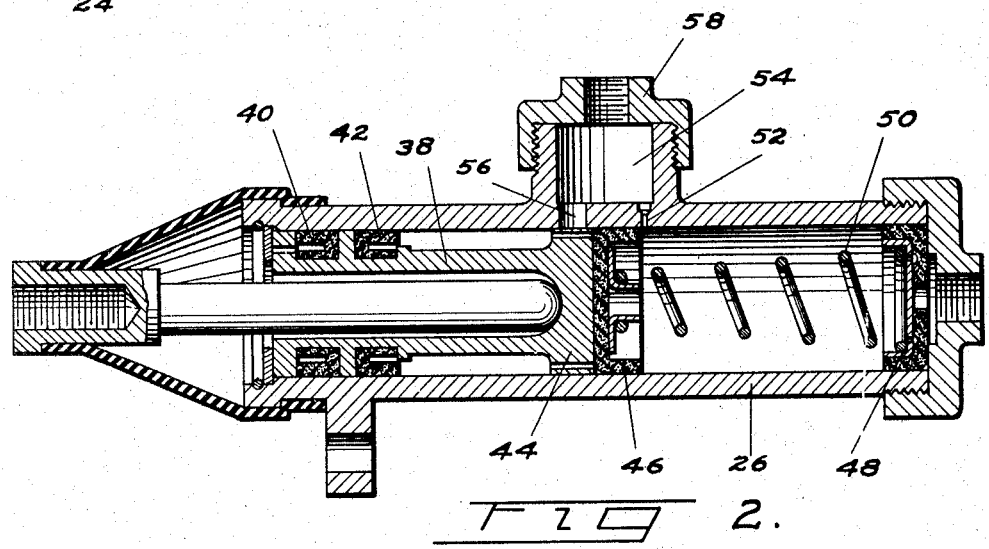
Figure 2 is an enlarged view in vertical section of the master cylinder shown in Figure 1.
Figure 3:
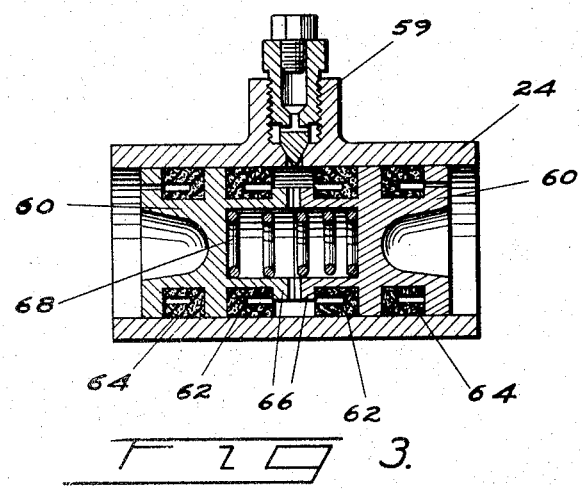
Figure 3 is an enlarged view in vertical section of the wheel cylinder shown in Figure 1.

Referring in detail to the drawings there is shown in Figure 1 a chassis of an automobile provided with side rails 10 and 12, a front axle 14, a rear axle 16, front road wheels 18 supporting said axle 14 and rear road wheels 20 supporting said rear axle 16. Each of the road wheels 18 and 20 are provided with a brake 22 adapted to be operated by a wheel cylinder 24 to which liquid is supplied from a master cylinder 26 by means of conduits 28 and 29. The liquid in the master cylinder, wheel cylinder and conduits is maintained under pressure by a vacuum pump 30, which is connected by a conduit 31 with the engine manifold 32 and is in constant communication through conduits 33 and 34 with the master cylinder 26 and the reservoir 36.

The master cylinder 26 is provided with a plunger 38 having reversed sealing cups 40 and 42 positioned adjacent to the rear end thereof and having a forward piston 44 provided with a sealing cup 46. The forward end of the cylinder 26 is provided with a two way check valve 48 weighted by a spring 50 which bears at one end upon the valve 48 and at its opposite end upon the cup 46. The cylinder 26 is formed just in advance of the cup 46 with a restricted port 52 communicating with a well 54 formed on the cylinder. It is also formed rearwardly thereof with a relatively large opening 56 normally closed by the piston 44 and also communicating with the well 54. The well 54 is provided with a cap 58 connected to the conduit 34.

The arrangement whereby the piston normally covers the port 56 prevents liquid held in the rearward portion of the cylinder from spilling or splashing out no matter what may be the position of the master cylinder and no matter what direction the vehicle is travelling. It also minimizes evaporation from the piston recess no matter how long the actuation of the brakes may be delayed.

It is to be understood that in the event of expansion of the liquid in the recess between the piston 44 and the cups 40—42 due to heat or other causes, a portion of the liquid may escape forward through the ports in the piston 44 and deflecting the cup 46 escape into the forward portion of the master cylinder and thence may escape into the reservoir through the port 52. Also in the event of contraction of the liquid in the recess to a depreciable degree liquid may seep from the well 54 around the piston 44 into said recess.

The wheel cylinders 24 are each provided with a pair of pistons 60. Each of these pistons is formed with a pair of annular grooves in which there are positioned a pair of annular cup packings 62 and 64 facing in directions opposite to each other. The pistons 60 are provided with slotted projections 66 which are adapted to contact with each other and limit the inward movement of the pistons. Interposed between the pistons is a spring 68 which normally urges the pistons outwardly into contact with the shoes.

The pump 30 comprises a thin sheet metal cylinder 70 provided with a cover 72 held upon the cylinder by means of a bolt 74 and a nut 76 secured to the upper end thereof. The bolt 74 comprises a tubular member 78 and a plug 80 threaded into the upper end thereof. The tubular member 78 may be filled with an absorbent material 82 for straining the air which is drawn from the pump by the engine. It is provided at its lower end with a fitting 84 open to the atmosphere through which air may flow in. It is provided intermediate its ends with a plurality of ports 86 through which air is admitted to the interior of the thin sheet metal cylinder 70. The plug 80 is formed at its upper end with a relatively large longitudinal bore 88 which is connected to the conduit 31 and through which air is drawn out through the manifold 32. It is provided with intersecting bores 89 connecting the bore 88 with the interior of the thin sheet metal cylinder 70.

Within the thin sheet metal cylinder 70 there is also provided an annular piston 90 normally urged downward by a spring 91 and a pair of valve sleeves 92 and 94 controlled by the piston. The interior of the valve sleeve 92 is in constant communication with the space in the cylinder 70 surrounding the sleeve by means of ports 93 in the sleeve 92. Thus by means of the sleeves 92 and 94, the bores 88 and 89 are alternatively connected with the interior of the thin sheet metal cylinder 70. A latch is provided for positioning the sleeves at the desired points. It comprises one or more spring pressed balls such as 96 adapted to fit either in one or in the other of a pair of grooves 98 and 100 formed in the sleeve. Springs 102 and 104 are positioned between flanges on the sleeves 94 and 92 and between a flange on the sleeve 94 and the piston 90 respectively. A fitting 105 threaded into the lower end of the pump is connected to the conduit 33 and cooperates with the conduit to connect the pump with the reservoir 36 and with the master cylinder 26.

The reservoir 36 is provided to hold the reserve supply of liquid. It is formed with a cap 106 which is held in position by a bolt 108 and a nut 110 therefor. The bolt 108 comprises a tubular member 111 and a plug 112 therefor. The reservoir is provided with a piston 113 formed with ports 114 and having associated therewith a cup packing 115. The piston 113 is maintained under predetermined pressure by a spring 116, a portion of the liquid being maintained under the piston 113 and under the pressure of the spring 116 and a portion thereof being maintained above the piston 113 under atmospheric pressure.

The upper end of the bolt 108 is provided with a vented fitting 118 which normally maintains the upper portion of the interior of the reservoir under atmospheric pressure. The tubular member 111 is provided with a plurality of ports such as 120 and 122 for filling the upper part of the reservoir and with a constricted port 124 for relieving the hydraulic system should any excessively high pressure be developed. It is clear that if hydraulic pressure is developed high enough to compress the spring 116 and to raise the piston 113 above the ports 124, liquid may escape from beneath the piston through ports 124 and thence through ports 120 so as to lower the pressure beneath the piston. The plug 112 is formed with a relatively large longitudinal bore 126 which is connected with the conduit 33 and through the conduit with the fitting 104 and the well 54. An intersecting bore 128 connects the longitudinal bore 126 with the lower part of the reservoir 36.

In the operation of this embodiment of my invention, liquid is introduced into the reservoir 36 through the tubular member 111 and the bleed openings 59 in the wheel cylinders are successively opened. Operation of the motor draws the air from the interior of the thin sheet metal cylinder 70, through the manifold 32, the conduit 31, and the port 88. This causes the piston 90 to be raised against the pressure of the spring 91 and thus draws fluid through the ports 114 in the piston 113 and past the cup 115 thereof and thence through the bores 128 and 126, through the conduit 33 and the fitting 105 into the lower part of the thin sheet metal cylinder 70. As the piston 90 approaches its upper limit of travel, the spring 104 contacts with the lower end of the sleeve 94 and builds up pressure thereon until the pressure is sufficient to overcome the holding effect of the balls 96 in the groove 98. Thereupon the sleeve 94 is quickly moved to its upper position so that the balls 96 move into the groove 100 and so that the ports 80 are closed and the ports 86 are opened. Thereupon air passes freely through the fitting 84 and the ports 86 to the interior of the pump 30. Air under atmospheric pressure thus being admitted, the spring 91 forces the piston 90 downward until the spring 102 contacts with the flange on the lower end of the sleeve 94 and then builds up sufficient pressure to move the sleeve back to the position shown in Figure 4. Also, whenever the motor is stopped or the vacuum decreases, the piston 90 is moved downward by the spring 91 which is capable of exerting a pressure greater than atmospheric but less than twice atmospheric (e. g. 24 lbs.). The downward movement of the piston 90 whether by reason of the stopping of the motor, the decrease of vacuum, or the shifting of the valve 94, forces the liquid through the conduit 33 to the well 54 and thence through the port 52 into the cylinder 26. Thence liquid is forced past the two-way check valve 48 into the conduit 29 and to the wheel cylinders 24. Subsequent operation of the motor tends to draw further liquid from the upper part of the reservoir 36 and subsequent drops in vacuum pressure forces additional fluid into the master cylinder and wheel cylinder until the system is filled with liquid, all air being forced out through the bleed openings 59. Subsequent thereto by reason of increases and decreases in the vacuum exerted additional fluid forced down by the piston 90 causes the piston 113 to be raised and places the liquid in the system under the pressure of the spring 116 which is capable of exerting a pressure substantially equal to that of the spring 91. Operation of the master cylinder causes the liquid under pressure to fill the rear portion of the master cylinder displacing any air trapped therein and causing it to rise to the reservoir and provide an additional resilient cushion therein. Subsequent operation of the motor tends to increase the pressure built up upon the liquid in the system until it reaches a value determined by the springs 91 and 116. If expansion of the fluid in the system because of heat creates a higher pressure the port 124 is uncovered whereupon fluid may be relieved from beneath the piston 113 to the portion of the reservoir above said piston. This superatmospheric pressure in the system prevents air (which obviously is only under atmospheric pressure)

from being sucked in at the wheel cylinders, the rear of the master cylinder and other more or less exposed portions of the system. The reversed cups positioned at each end of the wheel cylinders, and at the rear end of the master cylinder aid in preventing air from leaking in.

It is to be understood that after bleeding is accomplished and the system is filled with liquid, further operation of the pumping system traps a quantity of liquid under the pistons 90 and 113 and this liquid is thus under the pressure of the springs 91 and 116. This trapped liquid prevents either of the pistons moving to their lowermost position and thus the sleeve 94 is normally maintained in its upper position closing the ports 89. However, when the liquid level beneath the pistons in the reservoir 36 and the cylinder 70 drops to a point adjacent the bottom, the pump is again automatically operated to trap more liquid under the pistons.

It is to be further understood that though the strengths of the springs 91 and 116 are equal initially, whenever the piston 90 is raised compressing the spring 91 while the piston 113 remains at the bottom of the reservoir 36, as soon as air is admitted to the cylinder 70 the spring 91 being compressed exerts more force than the spring 116. Thus when air is introduced through the inlet 84 and the ports 86, the piston 90 moves down forcing the piston 113 up until the two springs are again in balance.

In Figure 5 I have shown a modified form of my invention in which a reservoir 228 is connected with a conduit 234 which is adapted to be connected with a master cylinder (not shown) and has its upper end connected by a conduit 233 with a pressure responsive device 230. The pressure responsive device is provided with a piston 290 normally urged outward by a relatively light spring 291 and limited in its outward movement by a stop 292. At the end opposite to the connection with the conduit 233 the device is provided with a funnel 201. The reservoir 228 and the conduit 233 as well as the left-hand end of the cylinder 230 are normally filled with liquid. The conduit 234 leads from the lower end of the reservoir 228 to a master cylinder similarly to the connection described above for the conduit 34 of Figure 1.

If the automobile is traveling, air pressure entering the funnel 201 acts upon the piston 290 and thus develops pressure in the conduit 233 and in the reservoir 228 thus maintaining the liquid in the system under pressure which is responsive to the speed of the vehicle in traveling.

It is to be understood that the above described embodiments of my invention are for the purpose of illustration only and various changes may be made therein without departing from the spirit and scope of the invention.

I claim:

1. In a hydraulic braking system a master cylinder provided with a pair of spaced ports, one being a rearward port and the other a forward port, a reservoir communicating with said ports, means for normally covering one of said ports and for at times uncovering said rearward port and covering the forward port, said means comprising a piston formed with a recess which recess is normally positioned rearwardly of both of said ports but is at times moved with the piston to register with the rearward port, and including a packing cup positioned in advance of said piston and normally positioned intermediate said ports, said piston having ports through which liquid may flow on the retractile stroke of said piston.

2. In a hydraulic braking system, a master cylinder formed with a forward end and a rearward end, provided with a pair of longitudinally spaced ports, a reservoir communicating with said ports, and a plunger formed with a recess which when the plunger is moved forward from its released position registers with one of said ports and said plunger having means which during the retracting stroke of the plunger allows communication with the portion of the cylinder ahead of said plunger and being provided with a forward piston normally positioned to cover the rearward of said ports.

3. In a hydraulic brake system a reservoir, a central tubular member extending through said reservoir and formed with an intersecting bore, and an annular piston within said reservoir surrounding said tubular member and adapted to pass over said intersecting bore.

4. In a hydraulic brake system a reservoir, a central tubular member extending through said reservoir and formed with an intersecting bore, an annular piston within said reservoir surrounding said tubular member and adapted to pass over said intersecting bore, and a spring acting upon said piston.

5. In a hydraulic brake system, a master cylinder formed with a pair of inlet ports, a piston in said cylinder having a forward head normally positioned rearward of one of said ports and covering the other said port and having a head positioned rearwardly of both of said ports thus forming a chamber between the heads, and means for moving said piston so that the forward head advances in front of both of said ports.

EUGENE G. CARROLL.